United States Patent
Palmer et al.

(10) Patent No.: US 9,710,874 B2
(45) Date of Patent: Jul. 18, 2017

(54) MID-PRIMITIVE GRAPHICS EXECUTION PREEMPTION

(71) Applicant: NVIDIA Corporation, Santa Clara, CA (US)

(72) Inventors: Gregory Scott Palmer, Cedar Park, TX (US); Ziyad S. Hakura, Gilroy, CA (US); Emmett M. Kilgariff, San Jose, CA (US); Dale L. Kirkland, Madison, AL (US); Lacky V. Shah, Los Altos, Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 327 days.

(21) Appl. No.: 13/728,881

(22) Filed: Dec. 27, 2012

(65) Prior Publication Data
US 2014/0184617 A1    Jul. 3, 2014

(51) Int. Cl.
G06T 1/20    (2006.01)

(52) U.S. Cl.
CPC ...................... *G06T 1/20* (2013.01)

(58) Field of Classification Search
CPC ... G06T 1/20; G06T 1/60; G06T 15/80; G06F 17/5054; G06F 11/3466; G06F 2201/88; G06F 2212/69; G06F 15/8007; G06F 9/3824
See application file for complete search history.

(56) References Cited

U.S. PATENT DOCUMENTS

| | | | |
|---|---|---|---|
| 7,653,912 B2 * | 1/2010 | Frank | G06F 9/30047 710/260 |
| 8,139,070 B1 * | 3/2012 | Ostiguy | G06F 9/461 345/506 |
| 2012/0139918 A1 * | 6/2012 | Michail et al. | 345/421 |
| 2013/0117760 A1 * | 5/2013 | Cuadra | G06F 9/3861 718/108 |
| 2014/0022263 A1 * | 1/2014 | Hartog | G06T 1/20 345/506 |

* cited by examiner

*Primary Examiner* — James A Thompson
*Assistant Examiner* — Xilin Guo
(74) *Attorney, Agent, or Firm* — Artegis Law Group, LLP

(57) ABSTRACT

One embodiment of the present invention sets forth a technique for mid-primitive execution preemption. When preemption is initiated no new instructions are issued, in-flight instructions progress to an execution unit boundary, and the execution state is unloaded from the processing pipeline. The execution units within the processing pipeline, including the coarse rasterization unit complete execution of in-flight instructions and become idle. However, rasterization of a triangle may be preempted at a coarse raster region boundary. The amount of context state to be stored is reduced because the execution units are idle. Preempting at the mid-primitive level during rasterization reduces the time from when preemption is initiated to when another process can execute because the entire triangle is not rasterized.

23 Claims, 8 Drawing Sheets

MID-PRIMITIVE GRAPHICS EXECUTION PREEMPTION

BACKGROUND OF THE INVENTION

Field of the Invention

The present invention generally relates to program execution preemption and more specifically to mid-primitive graphics program execution preemption.

Description of the Related Art

Preemption is a mechanism used to time-slice a processor between multiple different applications. One application executing during a first time-slice is preempted so that another application can execute during a second time-slice. When multiple different applications need to use the processor simultaneously, one way to achieve forward progress for all the applications is to run each application for a short time-slice on the processor. Conventionally, time slicing requires that the processor pipeline be completely drained, and, once the processor is idle, a different application is set up to be executed by the processor pipeline. This mechanism for time slicing has been referred to as "wait for idle" preemption and is particularly inefficient when the processor takes a long time to drain the work that is running on the processor pipeline. For example, consider a very long running graphics shader program, or in the worst case, a shader program with an infinite loop. To be able maintain processing performance when time slicing between different applications, the amount of time incurred to idle execution of each application should be limited or reduced as much as possible.

Another mechanism that has been considered to implement preemption is to stall or freeze the processor without draining the processor pipeline. Once the processor is frozen, the contents of all the registers and pipeline flip-flops within the processor that represent the execution state for a particular application are stored into dedicated registers. When execution of that particular application resumes, the contents of all of the registers and pipeline flip-flops stored in the dedicated registers are restored. One drawback of this approach to preemption is that the size of the execution state can be quite large, such that the time needed to store and restore the execution state reduces the time available for executing each of the applications during the time slices.

Accordingly, what is needed in the art is a more effective approach to execution preemption.

SUMMARY OF THE INVENTION

A system and method for mid-primitive graphics program execution preemption does not depend on draining of the entire processing pipeline of in-flight instructions. When preemption is initiated, no new instructions are issued, in-flight instructions progress to an execution unit boundary, and the execution state is unloaded from the processing pipeline. The execution units within the processing pipeline, including the coarse rasterization unit complete execution of in-flight instructions and become idle. However, rasterization of a triangle may be preempted at a coarse raster region boundary. The amount of context state to be stored is reduced because the execution units are idle.

One embodiment of the present invention sets forth a method for preempting execution of program instructions in a multi-threaded system. The method includes rendering pixels associated with a single graphics primitive according to graphics program instructions executed according to a first context. The method further includes receiving a command to preempt rendering the pixels. The method further includes determining whether one or more streaming multiprocessors that are configured to execute the graphics program instructions according to the first context become idle within a predetermined time period. If the one or more streaming multiprocessors does not become idle within the predetermined time period, then the method further includes preempting rendering operations associated with the pixels, saving state related to the first context that is associated with a front end unit, and loading graphics program instructions to execute according to a second context and state related to the second context. If the one or more streaming multiprocessors does become idle within the predetermined time period, then the method further includes saving the state related to the first context that is associated with the front end unit, and loading the graphics program instructions to execute according to the second context and the state related to the second context.

Other embodiments include, without limitation, a subsystem that includes a first device configured to implement one or more aspects of the disclosed methods as well as a system configured to implement one or more aspects of the disclosed methods.

One advantage of the disclosed techniques is that the mid-primitive preemption mechanism reduces the amount of state that is saved when an application is preempted and that is restored when the application resumes execution. Additionally, processing of a large triangle may be preempted before rasterization of the entire triangle is completed to reduce the delay between when the preemption is initiated to when the preemption is completed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
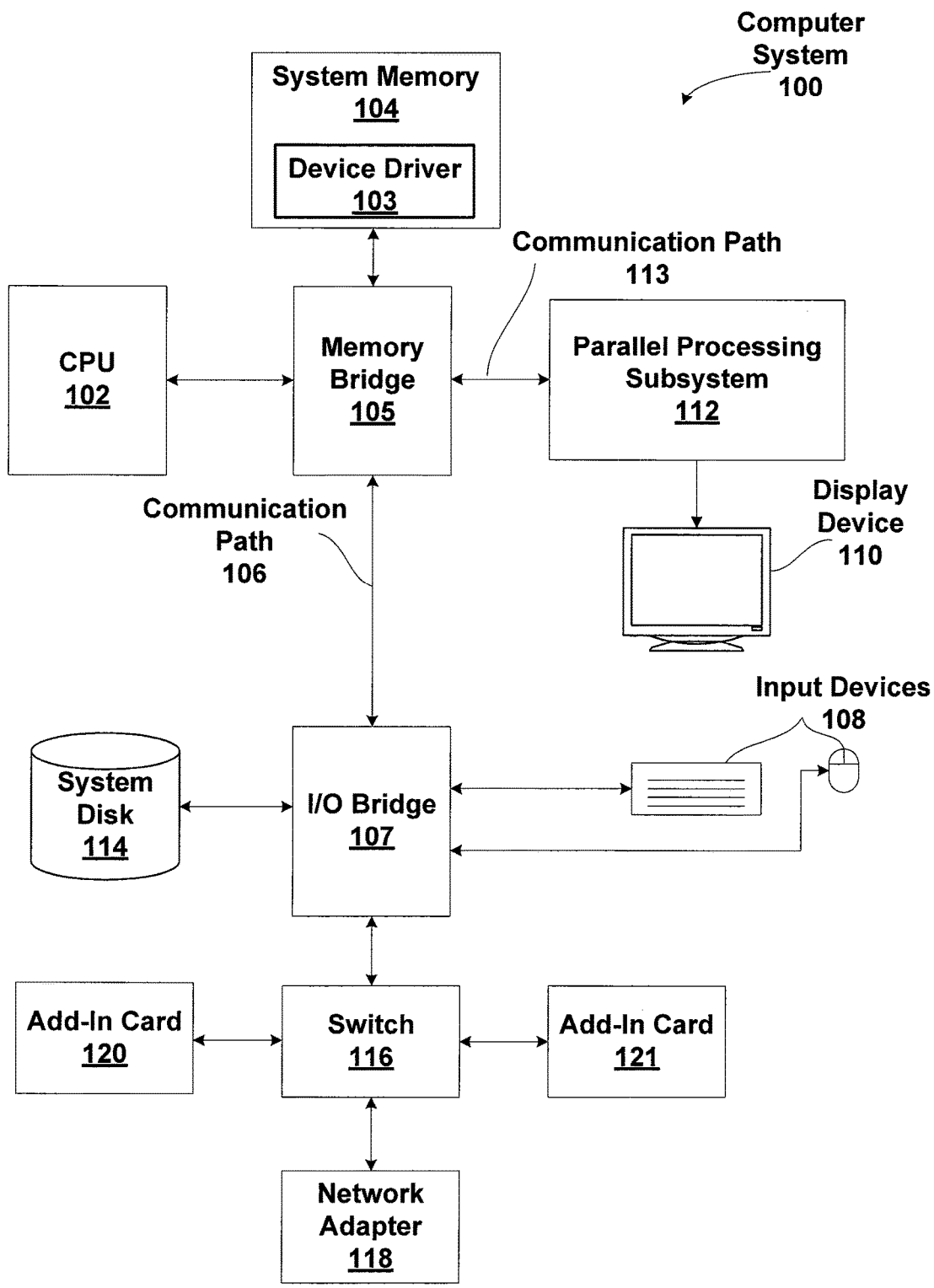
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
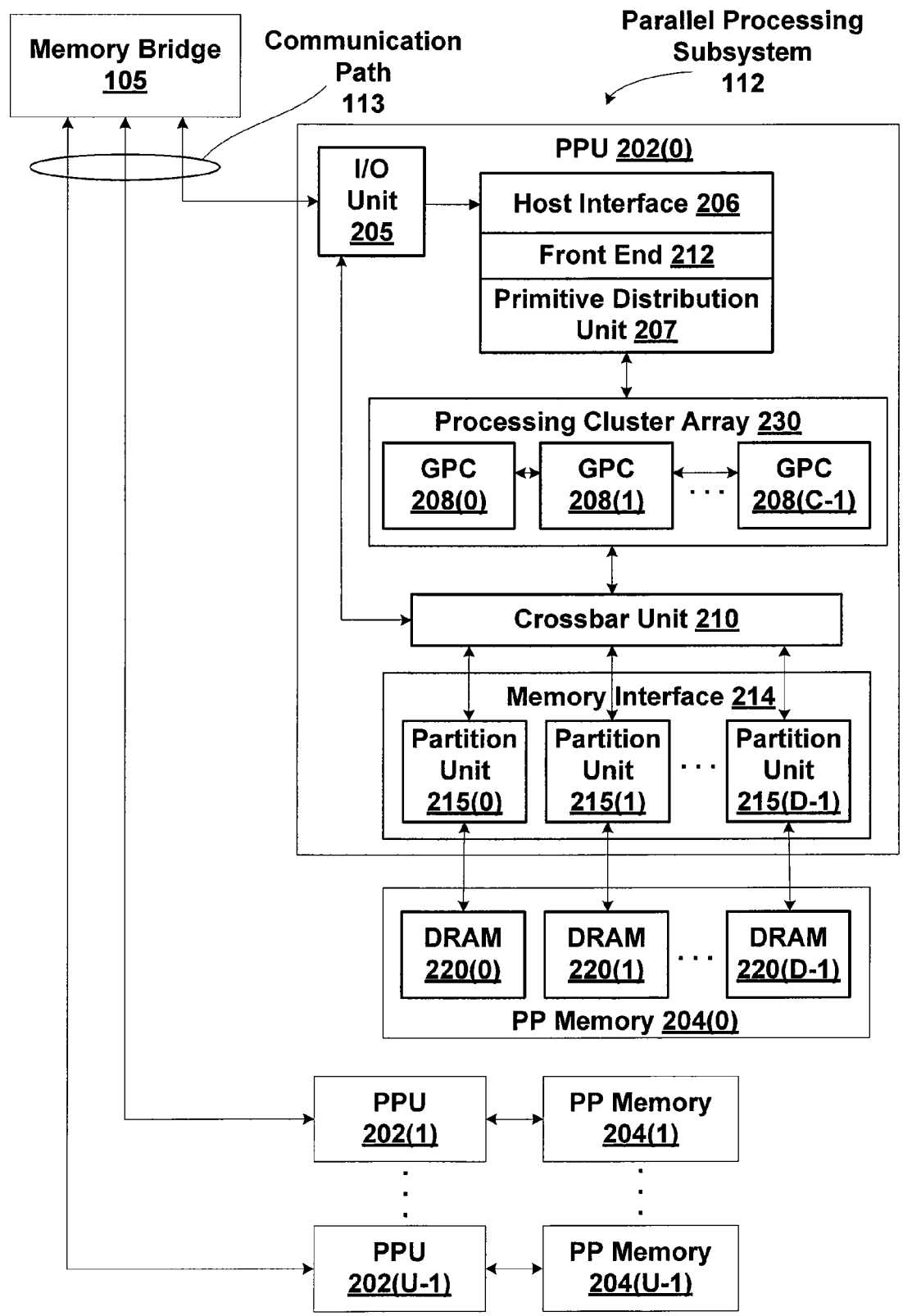
FIG. 2 is a block diagram of a parallel processing subsystem for the computer system of FIG. 1, according to one embodiment of the present invention.

FIG. 2 is a block diagram of a parallel processing subsystem 112 for the computer system 100 of FIG. 1, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a primitive distribution unit 207. The primitive distribution unit 207 receives pointers to processing tasks that are encoded as graphics primitives and stored in memory. Graphics primitives are elemental graphics objects suitable for rendering by the GPCs 208, including, without limitation, points, line segments, triangles, triangle chains, and quadratic patches. The pointers to graphics primitives are included in the command stream that is stored as a pushbuffer and received by the front end unit 212 from the host interface 206. Processing tasks that may be encoded as graphics primitives include indices of graphics data to be processed, as well as state parameters and commands defining how the graphics data is to be processed (e.g., what shader program is to be executed). The primitive distribution unit 207 receives tasks from the front end 212 and ensures that GPCs 208 are configured to a valid state before the processing specified by each one of the graphics primitives is initiated. A priority may be specified for each graphics primitive that is used to schedule execution of the processing task.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Task Processing Overview

Figure 3A:
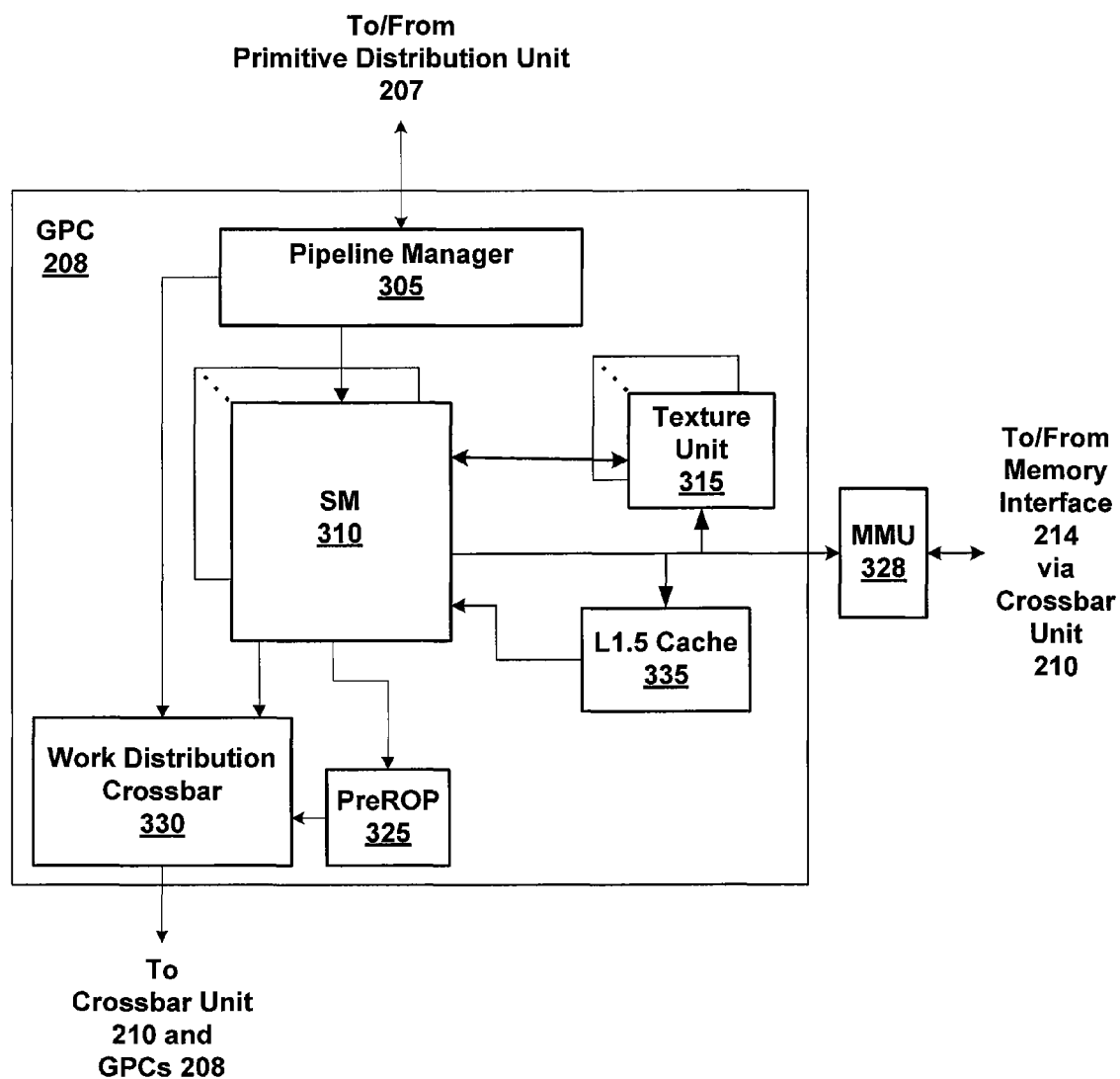
FIG. 3A is a block diagram of a general processing cluster within one of the parallel processing units of FIG. 2, according to one embodiment of the present invention.

FIG. 3A is a block diagram of a general processing cluster 208 within one of the parallel processing units 202 of FIG.

2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Each SM 310 contains a level one (L1) cache (not shown) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache 312 within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
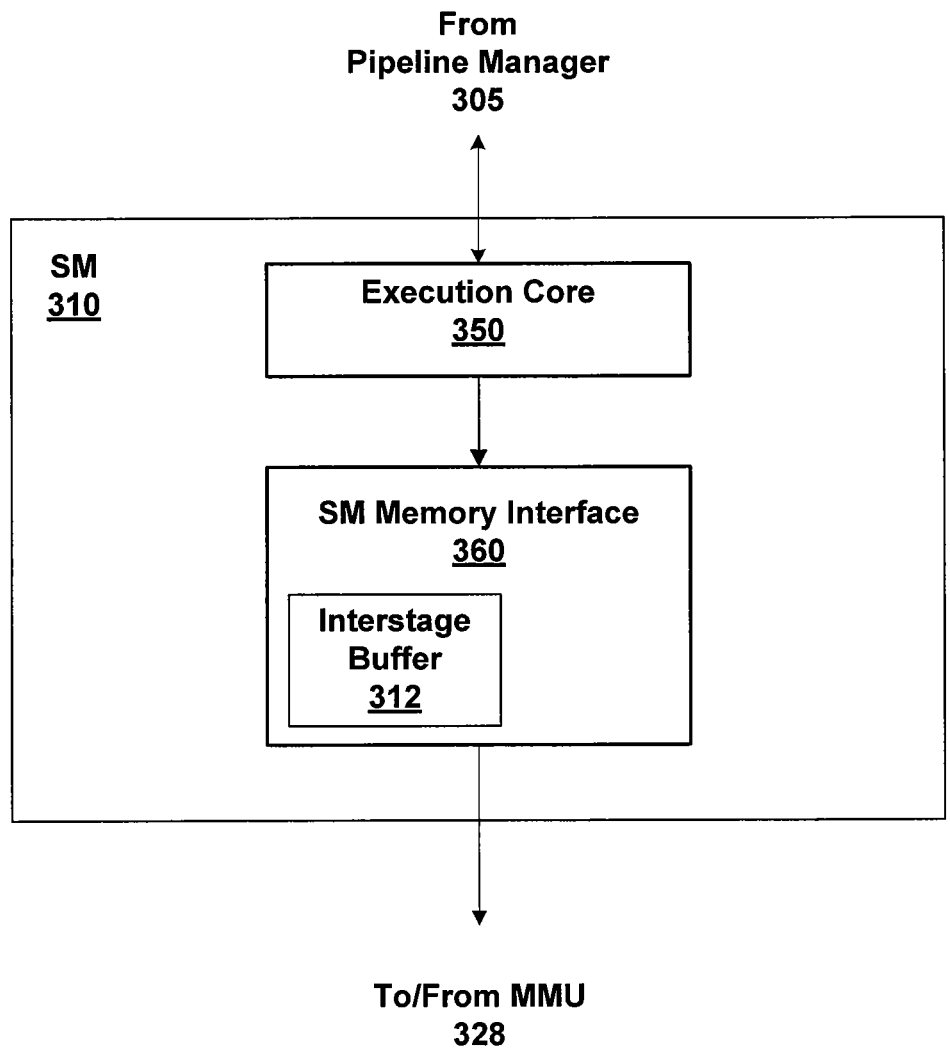
FIG. 3B is a block diagram of a streaming multiprocessor within the general processing cluster of FIG. 3A, according to one embodiment of the present invention.

FIG. 3B is a block diagram of a streaming multiprocessor (SM) 310 within the general processing cluster 208 of FIG. 3A, according to one embodiment of the present invention. As shown, the SM 310 includes an execution core 350 and an SM memory interface 360.

The execution core 350 executes sets of program instructions that, when loaded as part of an application program, cause the SM to perform various graphics functions. As further described below, in conjunction with FIG. 4A, these sets of program instructions, executing on the execution core 350, configure the SM 310 to be one of a variety of graphics shaders, including, without limitation, vertex shaders, hull shaders, domain shaders, geometry shaders, and pixel shaders. The shaders receive data from the pipeline manager 305. In addition, each shader connects to various memory resources via the SM memory interface 360.

The SM memory interface 360 connects the execution core to external memory, via the MMUI 328, and to internal memory. One such internal memory is the inter-stage buffer 312. In some embodiments, the execution core 350, executing a shader, may read input data from a first portion of the inter-stage buffer 312 and write output data to a second portion of the inter-stage buffer 312. A subsequent shader may read input data from the second portion of the inter-stage buffer 312 and write output data to a third portion of the inter-stage buffer 312, and so on.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Program Execution and Preemption

Preemption may be used to time-slice a processor between multiple different applications so that the different applications are serialized and each execute for a short time-slice on the processor. The ability to quickly switch between different contexts running on a graphics processor is especially important on handheld devices such as cell phones and tablets because users of these devices expect a highly responsive system, regardless of the performance level of the graphics processor. In particular, users of handheld devices expect to quickly switch between different applications and that running any of these applications will not overwhelm the processing capabilities of the graphics processor so that operations such as scrolling cannot be performed or are no longer interactive.

Handheld devices typically use low-power graphics processors that have lower performance compared with high-end graphics processors. Therefore, the time needed to switch between different applications having different contexts may be longer compared with a high-end graphics processor. The delay for a context switch is caused by the comparatively lower processing performance and the reduced amount of memory available in which to store context state.

When a graphics processor is configured to perform a context switch as quickly as possible, all processing stops immediately and the contents of every register in the processing pipeline are stored to memory. If each context requires ~8 MB of memory and there are many contexts running on the graphics processor (even if the application is represented as an icon), then a significant fraction of the memory available in a handheld device is consumed just for storing the context state. Additionally, quick context switching also requires dedicated circuitry and complexity to enable storing and restoring all registers in the processing pipeline.

Another technique for context switching that is not as quick as stopping processing immediately and storing all of the context state is to allow the processing pipeline within the graphics processor to drain and become idle, i.e., wait-for-idle, before switching between different graphics applications. However, the time to drain to idle may be a significant fraction of the time-slice allocated to each graphics application. Slow switching between the different graphics applications executing on the graphics processor is perceived as poor interactivity by the end-user. A compromise between quick context switching and storing a large amount of context state is to stop processing at a graphics primitive, e.g., triangle or quadrilateral, boundary. However, in some cases, the time to reach a primitive boundary can be too long because a single primitive can cover the entire screen and require such complicated shading that it still takes too long to draw all of the pixels within the primitive.

Mid-primitive graphics preemption interrupts processing without having to wait for the graphics processing pipeline to drain to idle. Rendering is interrupted in the middle of a single primitive, potentially a full-screen primitive to allow a context switch to occur before all the pixels for the primitive are drawn. Overall interactivity of the system is improved compared with interrupting processing between two primitives since the currently running is stopped within a limited number of clock cycles, and the graphics processing pipeline can switch to processing another application that may be higher priority.

Figure 4A:
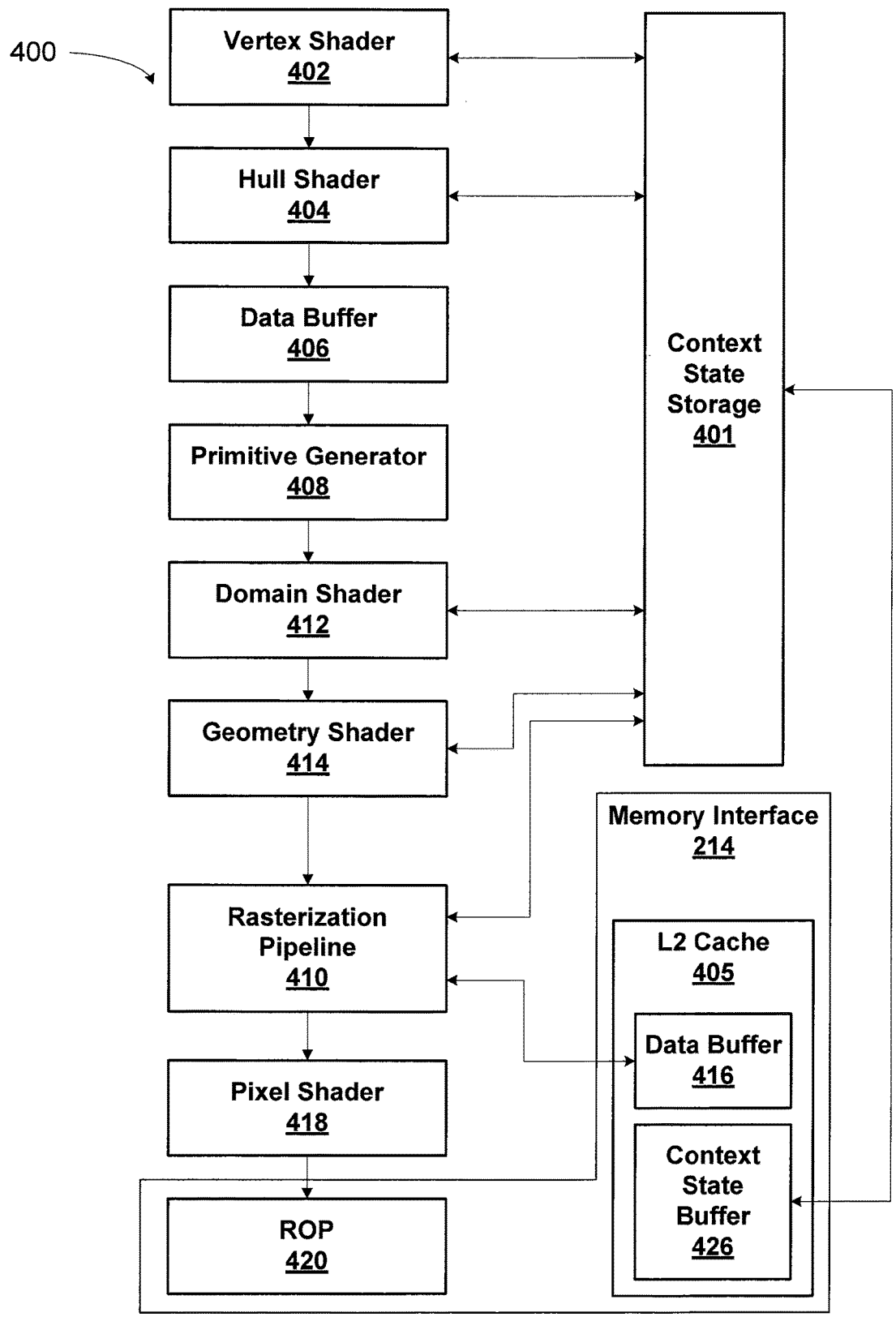
FIG. 4A is a block diagram of a graphics processing pipeline, according to one embodiment of the present invention.

FIG. 4A is a block diagram of a graphics processing pipeline 400, according to one embodiment of the present invention. As shown, the graphics processing pipeline 400 includes connections to a context state storage 401 and the memory interface 214.

The graphics processing pipeline 400 includes a vertex shader 402, a hull shader 404, a data buffer 406, a primitive generator 408, a domain shader 412, a geometry shader 414, a rasterization pipeline 410, and a pixel shader 418. The graphics processing pipeline 400 also includes a raster operations unit (ROP) 420, although as a physical matter, the ROP 420 resides in the memory interface 214. As further described below, the SMs 310 that are executing a vertex shader 402, hull shader 404, domain shader 412, or geometry shader 414 may be drained when a mid-primitive preemption is performed.

The vertex shader 402 is a programmable execution unit, such as SM 310, that is configured to execute vertex shader programs, lighting and transforming vertex data as specified by the vertex shader programs. For example, the vertex shader 402 may be programmed to transform the vertex data from an object-based coordinate representation (object space) to an alternatively based coordinate system such as world space or normalized device coordinates (NDC) space. The vertex shader 402 may read data that is stored in inter-stage buffer 312, parallel processing memory 204, or system memory 104 by the primitive distribution unit 207 for use in processing the vertex data. The output data from the vertex shader 402 as the SMs 310 execute is stored in the inter-stage buffer 312. The data in the inter-stage buffer 312 is passed to the next shader stage, the hull shader 404, to provide input data. During mid-primitive preemption, the vertex shader 402 drains output data into the inter-stage buffer 312, and then the contents of the inter-stage buffer 312 are copied to the context state storage 401 rather than being processed by the hull shader 404.

The hull shader 404 generates graphics primitives known as patches that are stored in the inter-stage buffer 312. The hull shader 404 also generates various patch attributes. The hull shader 404 then stores the patch data and patch attributes in the data buffer 406.

The data buffer 406 stores patch data and patch attributes generated by the hull shader 404. The primitive generator 408 then reads the patch data and patch attributes from the data buffer 406 and performs further processing on the patches.

The primitive generator 408 processes patches produced by the hull shader 404 and stored in the data buffer 406. When the primitive generation unit 408 reads and processes patch information from the inter-stage buffer 312, each patch may produce thousands of primitives. When the graphics processing pipeline 400 is preempted, waiting to process all primitives generated by a particular patch may result in an excessively long waiting period. During mid-primitive preemption, the primitive generation unit 408 is stopped immediately. The context state maintained in registers with the primitive generation unit 408 is then unloaded via a ramchain and stored in the context state storage 401. The ramchain is a ring-based backdoor access mechanism for copying internal pipeline registers and memory state from an SM 310 executing a shader program to the context state storage 401. During mid-primitive preemption, no extra work is needed to save data buffer 416 since the data in the data buffer 416 is already stored in the L2 cache 405, outside the processing cluster array 230. Likewise, the context state buffer 426, also stored in the L2 cache 405, maintains a copy of the context state storage 401. As such, no extra work is needed to save the context state buffer 426 during mid-primitive preemption either. The output data from the primitive generator 408 is sent to the domain shader.

The domain shader 412 reads input data from the data buffer 406 via the primitive generator 408, and writes output data to the inter-stage buffer 312. This output data in the inter-stage buffer 312 is passed to the next shader stage, the geometry shader 414 as input data. During mid-primitive preemption, the domain shader 412 drains output data into the inter-stage buffer 312. During preemption, the data in the inter-stage buffer is copied to the context state storage 401 rather than being processed by the geometry shader 414.

The geometry shader 414 processes data in the form of various graphics primitives, including, without limitation, points, line segments, triangles, and triangle chains. Depending on the particular program instructions executed by the geometry shader 414, the geometry shader 414 may expand one graphics primitive into over a thousand vertices. When the geometry shader 414 executes, the vertex attributes corresponding to the vertices are stored to the context state storage 401 while vertex indices and pointers to the vertex attributes are routed to the rasterization pipeline 410. During mid-primitive preemption, no extra work is required to save the contents of the context state buffer 426, because the context state buffer 426 is stored in the L2 cache 405. As described above, the context state buffer 426 maintains a copy of the context state storage 401. Output data from the geometry shader is then sent to the rasterization pipeline 410.

As further described below in conjunction with FIG. 4B, the rasterization pipeline 410 reads the vertex attributes generated by the geometry shader 414, and rasterizes pixel fragments based on the vertex attributes into screen space. The rasterization pipeline 410 scan converts the new graphics primitives and outputs fragments and coverage data to fragment processing unit 460. Additionally, rasterization pipeline 410 may be configured to perform z culling and other z-based optimizations. During preemption, the rasterization pipeline 410 stops reading the vertex attributes from the data buffer 416 and completes the processing of a portion of a graphics primitive within a coarse rasterization region. The processing units within the rasterization pipeline 410 prior to and including the coarse rasterizer 440 stop immediately and save the current state via a ramchain to the context state storage 401. The processing units within the rasterization pipeline 410 after the coarse rasterizer 440 are drained. Any work generated by the final coarse raster tile is passed to the pixel shader 418.

The pixel shader 418 is a programmable execution unit that is configured to execute pixel shader programs, transforming pixel received from rasterization pipeline 410, as specified by the pixel shader programs. For example, the pixel shader 418 may be programmed to perform operations such as perspective correction, texture mapping, shading, blending, and the like, to produce shaded pixels that are output to raster operations unit (ROP) 420. The pixel shader 418 may read data that is stored in parallel processing memory 204 or system memory 104 for use in processing the pixel data. Pixels may be shaded at pixel, sample, or other granularity, depending on the programmed sampling rate. Pixels being processed by the SMs 310 executing the pixel shader 418 are drained into the ROP 420 and processed.

The raster operations unit (ROP) 420 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 420 is configured to compress z or color data that is written to memory and decompress z or color data that is read from memory. During preemption, the ROP 420 is drained and the shaded and blended fragments are written to the frame buffer stored in graphics memory.

In some cases, storing the context state in response to a preemption context switch may be avoided. The front end 212 first attempts to wait-for-idle before initiating a mid-primitive preemption context switch. If the execution units within the processing pipeline reach idle quickly (e.g., in less than 100 microseconds), then the more memory efficient wait-for-idle context switch can be performed instead of the mid-primitive preemption.

Even when mid-primitive preemption is performed, the mid-primitive preemption mechanism takes advantage of the fact that many of the buffers for storing data generated during processing of the primitives, e.g., data buffer 416 and context state buffer 426, are maintained in the L2 cache 405 that resides in the memory interface 214. The PP memory 204, in turn, is a backing store for the L2 cache 405. Because data held in the L2 cache 405 is retained during preemption, the data buffer 416 and the context state buffer 426 do not need to be explicitly saved by a memory copy to perform the mid-primitive preemption. The data in the data buffer 416 and the context state buffer 426 can simply be left in the L2 cache 405 until the preempted context resumes. If additional space is needed in the L2 cache 405, then portions of the data buffer 416 and the context state buffer 426 can be written to the backing store and replaced with other context state for the application that is running following the preemption.

In order to reduce the amount of context state that is stored for mid-primitive preemption, some execution units within the processing cluster array 230 are drained while others are stopped at critical points during the processing. Specifically, operations that may perform data expansion (e.g., generating index buffers or performing tessellation) are stopped before the large expansion takes place to reduce the total amount of context state that is stored.

The preemption process has five phases that are controlled by the front end 212. A first phase (phase 1) stops the processing in the current context. For mid-primitive preemption this means stopping processing when only a portion of the pixels within a primitive have been rasterized. In contrast, primitive level preemption stops processing after one or more entire primitives are rasterized. The front end 212 stops sending new graphics primitives to the graphics processing pipeline 400. The front end 212 then asserts a preemption signal, and waits until various shaders within the graphics processing pipeline 400 acknowledge receipt of the preemption signal. The front end then waits while various shaders complete work on a current set of pixels associated with a graphics primitive, including, without limitation, the vertex shader 402, the hull shader 404, the domain generator 412, and the geometry shader 414. If an interrupt or fault occurs after preemption is initiated and during phase 1, then the front end 212 waits for the pending interrupt or fault to be cleared before proceeding to phase 2.

Once processing in the current context is stopped (and any interrupts or faults are cleared), phase 2 saves the current context's state in memory. The data buffer 406 and 416 are stored in the L2 cache 405 and the context state storage 401 is stored in the context state buffer 426 in the L2 cache 405. A special compute program is launched by the pipeline manager 305 to copy all the information stored in the inter-stage buffer 312 for all vertex shader 402, hull shader 404, domain shader 412, and geometry shader 414 stages to graphics memory. The front end 212 then asserts a context freeze to preserve additional context state of the graphics processing pipeline 400. This additional context state, such as state stored in registers of processing units that are not drained, is stored to the context state storage 401 via ramchains.

In phase 3, the front end 212 resets the units within the graphics processing pipeline 400. In Phase 4, the front end 212 loads a new context's state associated with a different application into the graphics processing pipeline 400. If the prior context was previously preempted, then certain context state, such as state stored in registers of processing units that were not drained, is restored to the graphics processing pipeline 400 via ramchains. The front end 212 then removes the context freeze. The front end 212 then executes a special compute program to restore all state to the inter-stage buffers 312 for all vertex shader 402, hull shader 404, domain shader 412, and geometry shader 414 stages. In phase 5, the front end 212 restarts the processing of any work that was preempted in a previous Phase 1. The front end 212 removes the preempt signal, thus allowing shaders in the graphics processing pipeline 400 to resume operation. The front end 212 then begins issuing new graphics primitives to the graphics processing pipeline 400.

When preempting a context, the host interface 206 selects a new context (associated with a different application) from the runlist to execute and instructs the front end 212 to begin context preemption. The front end 212 then configures the graphics processing pipeline to execute the new context by completing the five phases of the preemption process. After the five phases of the preemption process are completed, the front end 212 sends an acknowledge (ACK) to the host interface 206.

Prior to preemption, the data buffer 416 and the context state storage 401 store the context state for a particular context are allocated by a program executed on the CPU 102. The context state storage 401 may be copied to the context state buffer 426. In some embodiments, multiple contexts may be stored in the data buffer 416 and context state buffer 426. As such, the data buffer 416 and context state buffer 426 may include data for the current context, as well as data for one or more contexts previously stored and waiting to be restored. Each preemptible context includes one copy of data buffer 416 and context state buffer 426. In some embodiments, non-preemptible contexts may share data buffer 416 and context state buffer 426, because these buffers are empty at the time of a context switch.

An alternative to allocating enough memory for each data buffer 406 and 416 to support preemption is to limit the number of contexts that are allocated the larger data buffers 406 and 416 needed to support preemption. Only particular contexts would be identified as eligible for preemption. All other contexts would be required to perform wait-for-idle preemption.

Another approach to reduce the amount of memory needed to store the data buffers 406 and 416 is to dynamically allocate larger data buffers 406 and 416 from a shared pool of memory. Smaller buffers for storing data assuming that preemption is not supported may be allocated prior to execution. If a context is allocated data buffers 406 and 416 in the shared pool, then the context can be preempted. If the larger data buffer 406 and 416 cannot be dynamically allocated from the shared pool, then a wait-for-idle context switch is performed. The techniques for allocation of the data buffers 406 and 416 assuming a limited amount of memory are particularly useful for handheld device applications.

When a context is selected to be executed, the host interface 206 determines whether the selected context is a context that was previously preempted. A context reload (ctx_reload) flag indicating whether a context was preempted is maintained by the host interface 206. When the host interface 206 recognizes that the selected context was preempted, the previously unloaded and stored context state is reloaded before execution of the selected context resumes.

In one embodiment, the front end 212 signals the host interface 206 as to whether the context was idle when the host interface 206 initiated the preemption. If the context was idle, i.e., the processing pipeline was idle and there were no outstanding memory requests, then the preempted context does not need to be reloaded before execution of the context resumes. If the context was not idle, then the host interface 206 saves the context reload state to be processed when the channel is reloaded.

In one embodiment, the processing pipeline may already be idle when the front end 212 receives the preempt command from the host interface 206. For example, the primitive distribution unit 207 could be in a state such that no tasks are running. When the processing pipeline is already idle, the front end 212 does not send a preempt command to the primitive distribution unit 207, but rather continues with the second phase of the preemption process. In such a case, the idle state of the primitive distribution unit 207, SMs 310, and other execution units within the processing cluster array 230 would enable those units to receive a new context state or restore a context state.

Figure 4B:
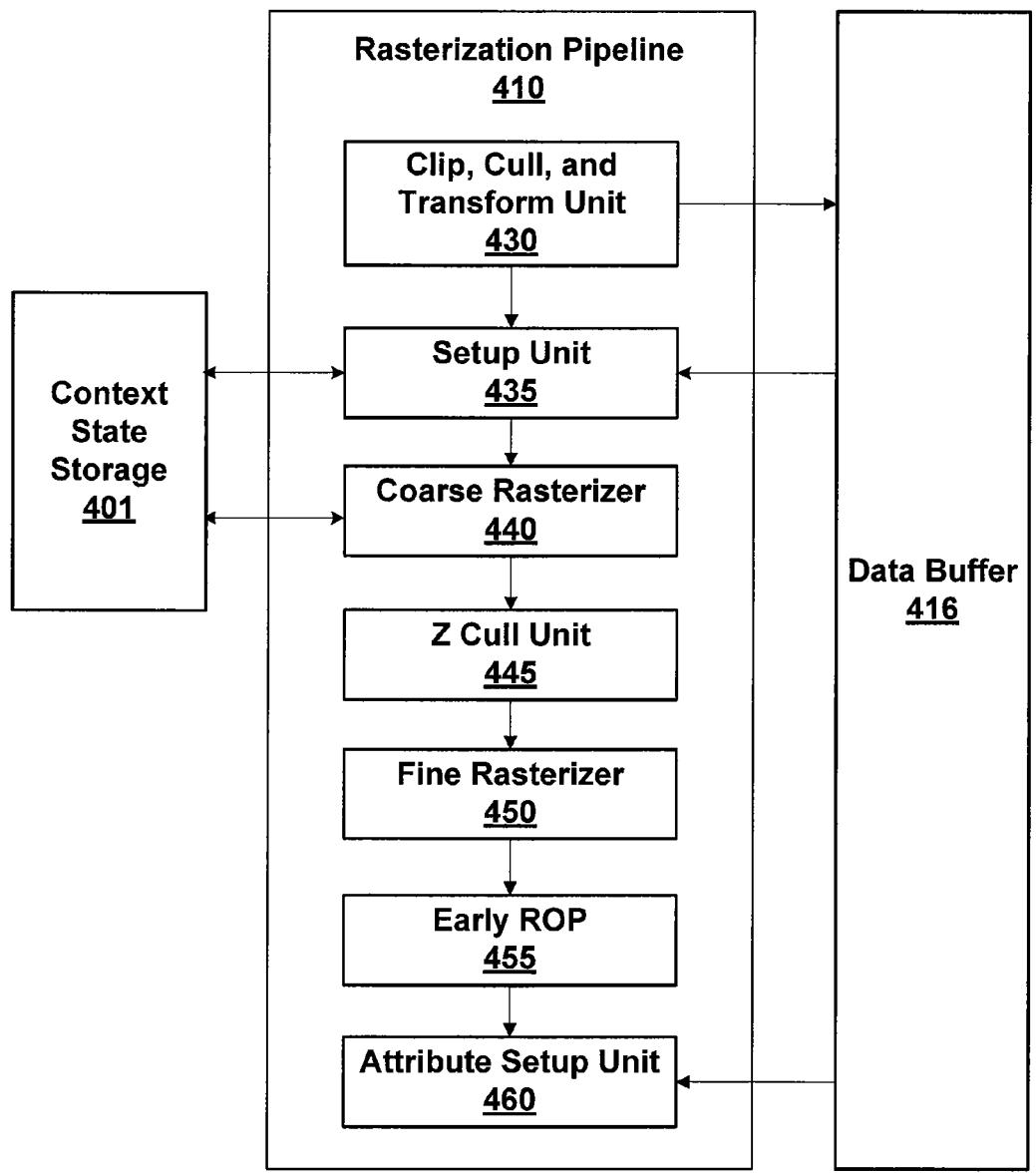
FIG. 4B is a block diagram of the rasterization pipeline of FIG. 4A, according to one embodiment of the present invention.

FIG. 4B is a block diagram of the rasterization pipeline 410 of FIG. 4A, according to one embodiment of the present invention. The rasterization pipeline 410 includes a clip, cull, and transform unit 430, a setup unit 435, a coarse rasterizer 440, a z cull unit 445, a fine rasterizer 450, an early raster operations unit 455, and an attribute setup unit 460.

The rasterization pipeline 410 scan converts the graphics primitives and outputs fragments and coverage data to SMs 310 configured to execute a pixel shader program. The clip, cull, and transform unit 430 performs clipping, culling, and viewport transform and outputs vertex attributes to the data buffer 416. Pointers to the vertex attributes and vertex indices are output to the setup unit 435. In one embodiment, a bounding box associated with the vertex attributes is used by the crossbar unit 210 to route the primitives to the setup unit 435 that is responsible for the portion of the screen (or output image) intersected by the bounding box.

The setup unit 435 receives the pointers to the vertex attributes and vertex indices, reads position attributes included as part of the vertex attributes, and computes coefficients needed for rasterization. The rasterization operations are performed by a coarse rasterizer 440 and a fine rasterizer 450. The coarse rasterizer 456 determines which coarse raster regions of the screen may be covered by each graphics primitive based a bounding box that fully encloses the primitive. Coarse raster regions that are intersected by the primitive bounding box may include a pixel that is covered by the graphics primitive. Screen space is divided into several non-overlapping coarse raster regions such that each pixel is included in one and only one coarse raster regions. Each coarse raster region is divided into two or more non-overlapping fine raster regions such that each pixel is also included in one and only one fine raster region. In one embodiment, the coarse raster region may be 16×16 pixels and the fine raster region may be 8×8 pixels, such that each coarse raster region includes 4 fine raster regions.

The output of the coarse rasterizer 440 is coarse raster region coverage information specifying at least which fine raster regions are intersected by the primitive bounding box. The z cull unit 445 may be configured to perform z culling and other z-based optimizations for fine raster regions that are intersected by the primitive bounding box. The fine rasterizer 450 determines per-sample coverage information, i.e., fine coverage information, for each fine raster region that may included a sample within the primitive, according to the coarse raster region coverage information.

When mid-primitive preemption is performed, the coarse rasterizer 440 completes processing for the current coarse raster region, stopping at a coarse raster region within the current graphics primitive when the current graphics primitive intersects multiple coarse raster regions. The context state needed for the setup unit 435 and coarse rasterizer 440 to resume rasterization of the current graphics primitive after the context is saved. The vertex attributes stored in the data buffer 416 are stored in the L2 cache and do no need to be copied. Instead, only the pointers to the vertex attributes, vertex indices, and any other information needed to locate the vertex attributes is stored to the context state storage 401 via a ramchain.

Rather than storing all of the registers within the setup unit 435 so that rasterization can resume at the first pixel that was not previously rasterized, the setup unit 435 can replay rasterization and coverage information for the coarse raster regions that were previously generated by the coarse rasterizer 440 may be discarded. In such a case, the setup unit 435 stores the pixel number (a counter) identifying the first pixel as part of the context state.

When either mid-primitive preemption or wait-for-idle preemption is performed, the z cull unit 445, fine rasterizer 450, early ROP 455, and attribute setup unit 460 are drained. The early ROP 455 performs raster operations that can be performed prior to pixel shading. The attribute setup unit 460 computes plane equation coefficients for non-position attributes based on the vertex attributes read from the data buffer 416. The plane equation coefficients are output to the GPUs 208 that are configured to execution a pixel shader program.

Figure 5A:
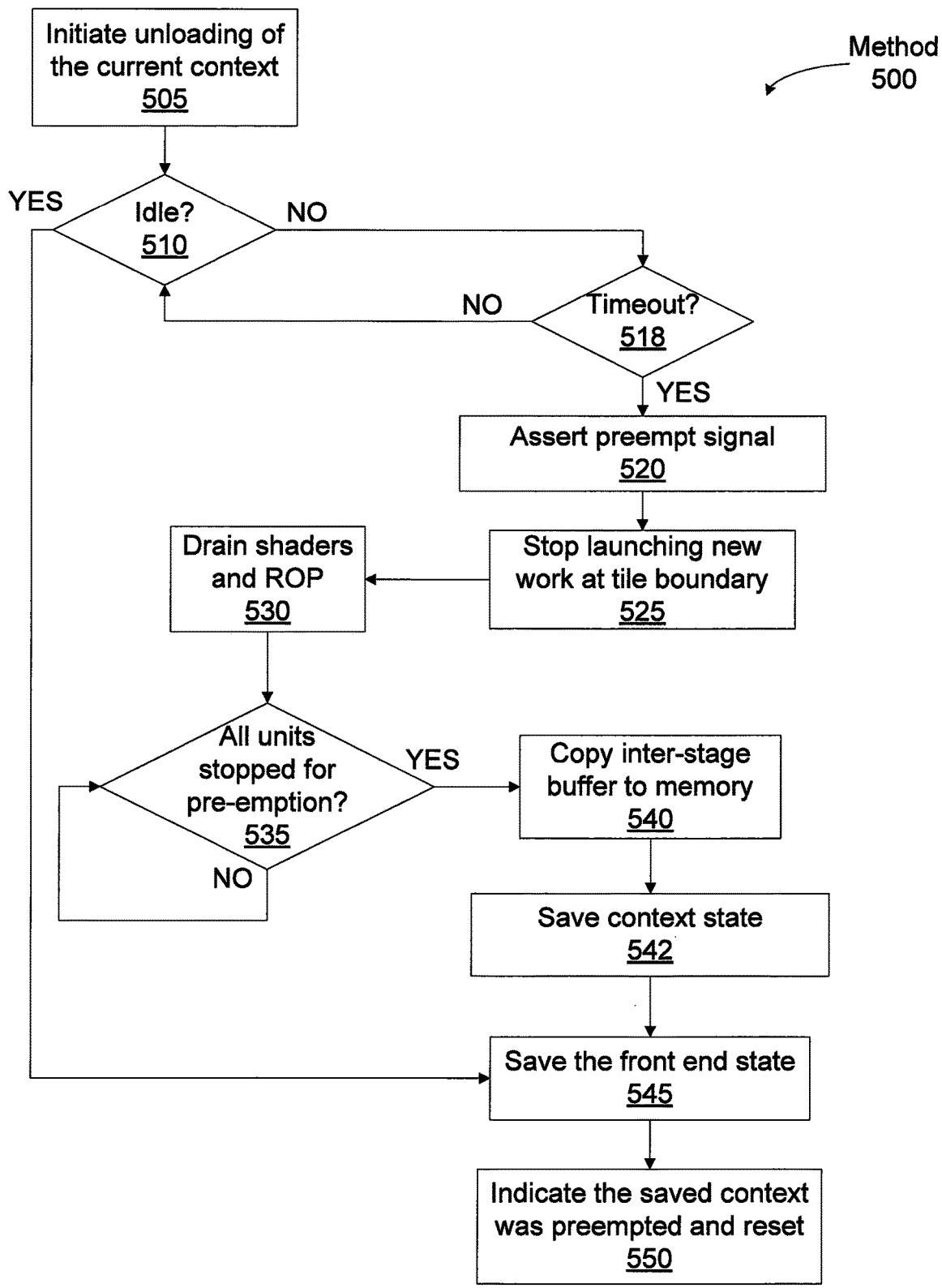
FIG. 5A sets forth a flow diagram of method steps depicting a process for preempting execution of a program and storing context state, according to one embodiment of the present invention.

FIG. 5A sets forth a flow diagram of method steps depicting a process for preempting execution of a program and storing context state, according to one embodiment of the present invention. Although the method steps are described in conjunction with the systems of FIGS. 1-4B, persons skilled in the art will understand that any system configured to perform the method steps, in any order, is within the scope of the invention.

As shown, a method 500 begins at step 505 the host interface 206 outputs preemption command to the front end 212 and the unloading of the current context is initiated. At step 510 the front end 212 determines whether the processing pipeline is idle, and, if so, then the front end 212 proceeds directly to step 545 to store the context state that is maintained by the front end 212.

If, however, at step 510 the front end 212 determines that the processing pipeline is not idle, then the method 500 proceeds to step 518, where the front end 212 determines if a wait-for-idle timeout has occurred, i.e., whether a timer has expired, and, if not, the method 500 returns to step 510. Otherwise, the method 500 proceeds to step 520, where the front end 212 asserts a preempt command directed to the primitive distribution unit 207. At step 525, the primitive distribution unit 207 stops issuing new work to the graphics processing pipeline 400 at a next tile boundary.

At step 530, the SMs 310 execute any in-flight shader program instructions and drain to become idle. The ROP 420 also executes any in-flight operations and drains to become idle. At step 535, the front end 212 determines whether all units, including SMs 310 executing shader programs and ROPs 420, are stopped in response to the preemption.

If, at step 535, all units are not stopped for preemption, then the method returns to step 535 where the front end 212 continues to wait for all units to stop. If, at step 535, all units are stopped for preemption, then the method proceeds to step 540, where the front end 212 copies the contents of the inter-stage buffer 312 to memory. At step 542, the front end 212 saves the context state to the context state storage 401, such as via a ramchain. In some embodiments, the context state storage 401, in turn, copies the context state to the context state buffer 426 in the L2 cache 405. Additional context state for the rasterization pipeline 410 may be maintained in the data buffer 416 in the L2 cache 405. At step 545, the front end saves the context state of the front end 212 as well. At step 550, the front end 212 stores an indicator that the saved context is related to a preemption, and then the front end 212 resets the graphics processing pipeline 400. The method 500 then terminates.

Figure 5B:
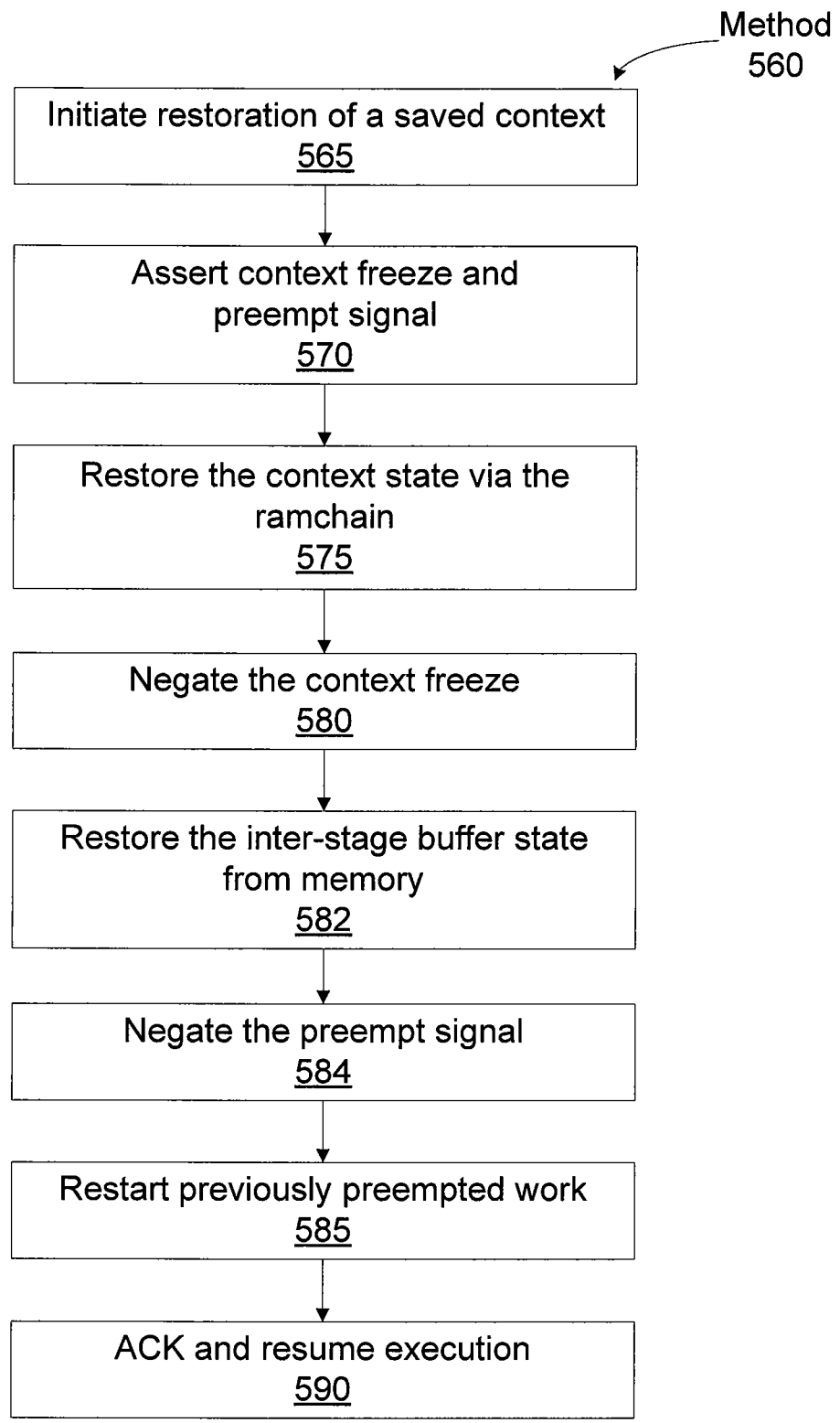
FIG. 5B sets forth a flow diagram of method steps depicting a process for restoring context state when a preempted process is restored, according to one embodiment of the present invention.

FIG. 5B sets forth a flow diagram of method steps depicting a process for restoring context state when a preempted process is restored, according to one embodiment of the present invention. Although the method steps are described in conjunction with the systems of FIGS. 1-4B, persons skilled in the art will understand that any system configured to perform the method steps, in any order, is within the scope of the invention.

As shown, a method 560 begins at step 565, where the front end 212 initiates restoration of a saved context for a context selected by the host interface 206. At step 570, the front end 212 asserts the context freeze signal to ensure that the graphics processing pipeline 400 does not perform any operation based on the transactions used by the front end 212 to restore the context state. The front end 212 also asserts a preempt signal. At step 575, the selected context state is read from the context state storage 401 and restored to registers within the primitive distribution unit 207 and the primitive generator 408 via respective ramchains. Any context state for the rasterization pipeline 410 stored in the context state storage 401 is also restored via a ramchain.

At step 580, the front end 212 negates the context freeze signal to release those portions of the processing pipeline 400 associated with context transfer, thus allowing the front end 212 to restore the state of the inter-stage buffers 312. At step 582, the front end 212 restores the state of the inter-stage buff 312 from memory. At step 584, the front end 212 negates the preempt signal, signaling that the front end 212 is exiting the restore mode and is no longer in a preemption state. At step 585, the front end 212 restarts previously preempted work that was in process at the time of the preemption. At step 590, execution is resumed using the restored context state for the selected context. At step 590, the front end 212 also ACKs the host interface 206 to signal that the instruction level preemption command has completed execution. The host interface 206 may now start sending more work from the pushbuffer to the front end 212. The method 560 then terminates.

In sum, execution of a graphics program may be preempted during rasterization of a triangle at a coarse raster region boundary. When preemption is initiated, no new instructions are issued, in-flight instructions progress to an execution unit boundary rather than draining thru the entire graphics processing pipeline, and the execution state is unloaded from the processing pipeline. The execution units within the processing pipeline, up to and including the coarse rasterization unit, complete partial execution of in-flight instructions and halt. Rasterization of a triangle may be halted at a coarse raster region boundary, and units below the coarse rasterization unit drain remaining pixel work to the frame buffer. Preempting at the mid-triangle level prevents a large triangle from causing a long delay between when the preemption is initiated, and the rasterization unit is drained to when the preemption is completed.

One advantage of the disclosed mid-primitive preemption technique is that the amount of state that is saved when an application is preempted, and restored when the application resumes execution, is reduced. Additionally, long-running rasterization of a large triangle may be preempted mid-primitive to avoid a long delay between when the preemption is initiated to when the preemption is completed. Finally, if the amount of time needed to complete execution of all the in-flight instructions during the context switch process exceeds a threshold, then the context switch process may force a mid-primitive preemption dynamically which stores additional state in memory rather than waiting for execution of all the in-flight instructions.

One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The disclosure has been described above with reference to specific embodiments. Persons of ordinary skill in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A method for preempting execution of program instructions in a multi-threaded system, the method comprising:
   rendering a first single graphics primitive received from a front end unit according to graphics program instructions executed according to a first context;
   receiving a command to preempt rendering the first single graphics primitive; and
   in response to determining that one or more streaming multiprocessors that are configured to execute the graphics program instructions according to the first context do not become idle within a predetermined time period:
      preempting rendering operations by stopping rendering of the first single graphics primitive when processing of the first single graphics primitive for a first coarse raster region intersected by the first single graphics primitive is complete, and before processing the first single graphics primitive for a second coarse raster region intersected by the first single graphics primitive, wherein each of the first coarse raster region and the second coarse raster region comprises two or more non-overlapping fine raster regions;
      saving state related to the first context that is associated with the front end unit; and
      loading graphics program instructions to execute according to a second context and state related to the second context.

2. The method of claim 1, wherein preempting execution of the program instructions further comprises:
   asserting a preemption signal to indicate that execution of the graphics program instructions executed according to the first context is preempted;
   waiting for the one or more streaming multiprocessors to become idle; and
   saving additional state related to the first context that is associated with the one or more streaming multiprocessors.

3. The method of claim 2, further comprising rendering a plurality of pixels associated with a second single graphics primitive according to graphics program instructions executed according to the second context.

4. The method of claim 3, further comprising:
   receiving a command to preempt rendering the plurality of pixels;
   determining whether the one or more streaming multiprocessors that are configured to execute the graphics program instructions according to the second context become idle within a predetermined time period; and
   if the one or more streaming multiprocessors does not become idle within the predetermined time period, then:
      preempting rendering operations associated with the plurality of pixels;
      saving state related to the second context that is associated with the front end unit; and
      loading graphics program instructions to execute according to the first context and state related to the first context; or
   if the one or more streaming multiprocessors does become idle within the predetermined time period, then:

saving the state related to the second context that is associated with the front end unit; and loading the graphics program instructions to execute according to the first context and the state related to the first context.

5. The method of claim 4, further comprising resuming rendering the first single graphics primitive.

6. The method of claim 2, further comprising removing the preemption signal.

7. The method of claim 2, wherein saving state related to the first context comprises executing a program that is configured to copy the state related to the first context state to memory.

8. The method of claim 1, wherein a first portion of the first single graphics primitive resides within a first coarse rasterization region, and a second portion of the first single graphics primitive resides within a second coarse rasterization region.

9. The method of claim 1, wherein at least a portion of first context state is maintained within a level-two cache when executing the graphics program instructions.

10. A subsystem for preempting execution of program instructions, comprising:
a memory including instructions; and
a processor that is coupled to the memory and, when executing the instructions, the processor performs the steps of:
rendering a first single graphics primitive received from a front end unit according to graphics program instructions executed according to a first context;
receiving a command to preempt rendering the first single graphics primitive; and
in response to determining that one or more streaming multiprocessors that are configured to execute the graphics program instructions according to the first context do not become idle within a predetermined time period:
preempting rendering operations by stopping rendering of the first single graphics primitive when processing of the first single graphics primitive for a first coarse raster region intersected by the first single graphics primitive is complete, and before processing the first single graphics primitive for a second coarse raster region intersected by the first single graphics primitive, wherein each of the first coarse raster region and the second coarse raster region comprises two or more non-overlapping fine raster regions;
saving state related to the first context that is associated with the front end unit; and
loading graphics program instructions to execute according to a second context and state related to the second context.

11. The subsystem of claim 10, wherein preempting execution of the program instructions further comprises:
asserting a preemption signal to indicate that execution of the graphics program instructions executed according to the first context is preempted;
waiting for the one or more streaming multiprocessors to become idle; and saving additional state related to the first context that is associated with the one or more streaming multiprocessors.

12. The subsystem of claim 11, wherein the front end unit further performs the step of rendering a plurality of pixels associated with a second single graphics primitive according to graphics program instructions executed according to the second context.

13. The subsystem of claim 12, wherein the front end unit further performs the steps of:
receiving a command to preempt rendering the second plurality of pixels;
determining whether the one or more streaming multiprocessors that are configured to execute the graphics program instructions according to the second context become idle within a predetermined time period; and
if the one or more streaming multiprocessors does not become idle within the predetermined time period, then:
preempting rendering operations associated with the plurality of pixels;
saving state related to the second context that is associated with the front end unit; and
loading graphics program instructions to execute according to the first context and state related to the first context; or
if the one or more streaming multiprocessors does become idle within the predetermined time period, then:
saving the state related to the second context that is associated with the front end unit; and
loading the graphics program instructions to execute according to the first context and the state related to the first context.

14. The subsystem of claim 13, wherein the front end unit further performs the step of resuming rendering the first single graphics primitive.

15. The subsystem of claim 11, wherein the front end unit further performs the step of removing the preemption signal.

16. The subsystem of claim 11, wherein saving state related to the first context comprises executing a program that is configured to copy the state related to the first context state to the memory.

17. The subsystem of claim 10, wherein a first portion of the first single graphics primitive resides within a first coarse rasterization region, and a second portion of the first single graphics primitive resides within a second coarse rasterization region.

18. The subsystem of claim 10, wherein at least a portion of first context state is maintained within a level-two cache when executing the graphics program instructions.

19. A system, comprising:
a front end unit;
one or more streaming multiprocessors that render pixels associated with graphics primitives;
logic that performs the steps of:
rendering a first single graphics primitive received from the front end unit according to graphics program instructions executed according to a first context;
receiving a command to preempt rendering the first single graphics primitive; and
in response to determining that one or more streaming multiprocessors that are configured to execute the graphics program instructions according to the first context do not become idle within a predetermined time period:
preempting rendering operations by stopping rendering of the first single graphics primitive when processing of the first single graphics primitive for a first coarse raster region intersected by the first single graphics primitive is complete, and before processing the first single graphics primitive for a second coarse raster region intersected by the first single graphics primitive, wherein each of the first coarse raster region and the second coarse raster region comprises two or more non-overlapping fine raster regions;

saving state related to the first context that is associated with the front end unit; and loading graphics program instructions to execute according to a second context and state related to the second context.

20. The system of claim 19, wherein the preempting rendering operations further comprises:

asserting a preemption signal to indicate that execution of the graphics program instructions executed according to the first context is preempted;

waiting for the one or more streaming multiprocessors to become idle; and saving additional state related to the first context that is associated with the one or more streaming multiprocessors.

21. The subsystem of claim 10, wherein the processor, upon resuming rendering of the first single graphics primitive, further replays rasterization information associated with the first coarse raster region, and resumes processing of the first single graphics primitive for the second coarse raster region.

22. The subsystem of claim 10, wherein preempting rendering operations further comprises causing one or more streaming multiprocessors that are executing one or more shader programs and a raster operations unit (ROP) to drain remaining pixel work to a buffer.

23. The subsystem of claim 10, wherein preempting rendering operations comprises copying coarse rasterizer state associated with the first single graphics primitive to a memory without copying vertex attributes associated with the first single graphics primitive to any memory.

* * * * *